United States Patent
Kuang et al.

(10) Patent No.: US 9,432,589 B2
(45) Date of Patent: Aug. 30, 2016

(54) SYSTEMS AND METHODS FOR GENERATING HIGH DYNAMIC RANGE IMAGES

(71) Applicant: OmniVision Technologies, Inc., Santa Clara, CA (US)

(72) Inventors: Jiangtao Kuang, Sunnyvale, CA (US); Donghui Wu, Sunnyvale, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 413 days.

(21) Appl. No.: 13/968,092

(22) Filed: Aug. 15, 2013

(65) Prior Publication Data
US 2015/0049215 A1 Feb. 19, 2015

(51) Int. Cl.
*H04N 5/357* (2011.01)
*G06T 5/40* (2006.01)
*G06T 5/00* (2006.01)
*H04N 5/235* (2006.01)
*H04N 5/355* (2011.01)

(52) U.S. Cl.
CPC ............. *H04N 5/2355* (2013.01); *G06T 5/002* (2013.01); *G06T 5/40* (2013.01); *H04N 5/2353* (2013.01); *H04N 5/35581* (2013.01); *G06T 2207/20208* (2013.01)

(58) Field of Classification Search
CPC ......... H04N 5/357; G06T 5/40; G06T 5/002; G06T 2207/20208
See application file for complete search history.

(56) References Cited

U.S. PATENT DOCUMENTS

| 7,995,107 B2 * | 8/2011 | Hoglund | B60R 1/00 348/222.1 |
| 2008/0170799 A1 * | 7/2008 | Chen | G06K 9/209 382/274 |
| 2014/0253764 A1 * | 9/2014 | Haas | H04N 5/361 348/243 |

FOREIGN PATENT DOCUMENTS

| CN | 101595719 A | 12/2009 |
| CN | 103237168 A | 8/2013 |

OTHER PUBLICATIONS

Taiwan Patent Application No. 103128144, English translation of Office Action of Mar. 4, 2016, 6 pages.

* cited by examiner

*Primary Examiner* — Matthew Salvucci
(74) *Attorney, Agent, or Firm* — Lathrop & Gage LLP

(57) ABSTRACT

A method determines a pixel value in a high dynamic range image from two images of different brightness by obtaining corresponding input pixel intensities from the two images, determining combination weights, and calculating the pixel value in the high dynamic range image as a weighted average of the input pixel intensities. Another method determines a pixel value in a high dynamic range image from more than two images by forming pairs of corresponding input pixel intensities, determining relative combination weights for the input pixels intensities for each pair, applying a normalization condition to determine absolute combination weights, and calculating the pixel value in the high dynamic range image as a weighted average of the input pixel intensities. Systems for generating high dynamic range image generation from two or more input images include a processor, a memory, a combination weight module, and a pixel value calculation module.

16 Claims, 5 Drawing Sheets

SYSTEMS AND METHODS FOR GENERATING HIGH DYNAMIC RANGE IMAGES

BACKGROUND

Standard image sensors have a limited dynamic range of about 60 to 70 dB or less. For example, an 8-bit sensor, which generally is more affordable than sensors with greater bit depth, has a dynamic range of only 48 dB. However, the luminance dynamic range of the real world is much larger and natural scenes often span a range of 90 dB or more. When an image sensor captures a scene with a luminance dynamic range in excess of the sensor dynamic range, information is necessarily lost. Depending on the exposure settings, the brighter regions may be saturated and/or the dimmer regions may be underexposed, producing a captured image of a quality unable to reproduce the actual scene.

In order to simultaneously capture highlights and shadows of a scene, High Dynamic Range (HDR) technologies have been used in image sensors to increase the captured dynamic range. One of the most common techniques to increase the dynamic range is to merge multiple exposures, captured with a standard, low dynamic range image sensor, into a single HDR image that has a much larger dynamic range than a single exposure image. For instance, images of the same scene could be recorded at a series of different exposure times, where the longest exposure is set to optimally capture the dimmest portions of the scene and the shortest exposure is set to optimally capture the brightest portions of the scene.

Properly combining multiple images to form a high quality HDR image is challenging. The combination process involves, for each pixel in the HDR image, making decisions about the relative weight of the corresponding pixels in the input images. HDR images frequently contain artifacts due to flaws inherent to the image combination process. As an example, discontinuities may be apparent in areas of the image representing smooth intensity and/or color transitions in the actual scene, the discontinuities being caused by discrete shifts in the weighting of input images as a function of the properties of the input image pixels, e.g., intensity, noise, and sensor response.

SUMMARY

In accord with the teachings herein, systems and methods generate high dynamic range images based on a plurality of input images. The methods disclosed herein generate high dynamic range images that are a smooth and real representation of the actual scene, void of discontinuities in regions of the image representing smooth brightness and/or color transitions in the actual scene, a common HDR image combination artifact in conventional solutions.

In an embodiment, a method determines a pixel value in a high dynamic range image based on first and second input images of different brightness. The method includes (a) obtaining a first input pixel intensity of a first pixel in the first input image and a second input pixel intensity of a corresponding pixel in the second input image, (b) determining a first combination weight for the first input pixel intensity and a second combination weight for the second input pixel intensity, each of the first and second combination weights being a function of the first and second input pixel intensities, and (c) calculating the pixel value in the high dynamic range image as a weighted average of the first and second input pixel intensities using the first and second combination weights, wherein the step of calculating comprises scaling the first and second input pixel intensities to a common image brightness.

In an embodiment, a method determines a pixel value in a high dynamic range image from N input images of different brightness, where N is an integer greater than two. The method includes (a) forming a list of pairs of input pixel intensities, each of the input pixel intensities corresponding to the same location in the N input images, and wherein all pairs in the list of pairs, except for the first pair in the list of pairs, comprise one of the input pixel intensities in the preceding pair in the list of pairs and one of the input pixel intensities not represented in any of the preceding pairs, (b) for each pair in the list of pairs, determining relative combination weights for the input pixels intensities, the relative combination weights being a function of both of the input pixel intensities in the pair, (c) applying a normalization condition to the relative combination weights to determine absolute combination weights, and (d) calculating the pixel value in the high dynamic range image as a weighted average of the input pixel intensities using the absolute combination weights, wherein the step of calculating comprises scaling the input pixel intensities to a common image brightness.

In an embodiment, a high dynamic range image generation system includes (a) a processor, (b) a memory communicatively coupled to the processor and including an image storage for storing first and second input pixel intensities from a first and second input image, (c) a combination weight module, including machine readable instructions stored in the memory, that when executed by the processor, perform the function of determining a first combination weight for the first input pixel intensity and a second combination weight for the second input pixel intensity, each of the first and second combination weights being a continuous function of the first and second input pixel intensities, and (d) a pixel value calculation module, including machine readable instructions stored in the memory, that when executed by the processor, perform the function of scaling the first and second input pixel intensities to a common brightness and calculating a pixel value in a high dynamic range image as a weighted average of the scaled first and second input pixel intensities using the first and second combination weights.

In an embodiment, a high dynamic range image generation system includes (a) a processor, (b) a memory communicatively coupled to the processor and including an image storage for storing input pixel intensities from N input images, where N is an integer greater than two, (c) a combination weight module including machine readable instructions stored in the memory, that when executed by the processor, perform the functions of (i) forming a list of pairs of input pixel intensities, each of the input intensities corresponding to the same location in the N input images, and wherein all pairs in the list of pairs, except for the first pair in the list of pairs, comprises one of the input pixel intensities in the preceding pair in the list of pairs and one of the input pixel intensities not represented in any of the preceding pairs, (ii) determining relative combination weights for the input pixel intensities, each of the relative combination weights for a pair in the list of pairs being a continuous function of both of the input pixel intensities in the pair, and (iii) applying a normalization condition to the relative combination weights to determine absolute combination weights, and (d) a pixel value calculation module including machine readable instructions stored in the memory, that when executed by the processor, perform the functions of scaling the input pixel intensities to a common brightness and calculating a pixel value in a high dynamic range image as a weighted average of the scaled input pixel intensities using the absolute combination weights.

DETAILED DESCRIPTION OF THE EMBODIMENTS

Disclosed herein are systems and methods for generating a HDR output image from multiple input images of lower dynamic range and of different brightnesses. The input images may be recorded, for instance, at different exposure times, camera gains, and/or aperture stops. Each pixel in the HDR output image is assigned a value that is a function of the intensities of the corresponding pixel in the input images. The function includes combination weights to weigh the pixel intensities from the different input images, scaling factors to scale the different input images to a common brightness, and, optionally, corrections to the scaling.

The combination weights serve to create a weighted average of the input pixel intensities scaled to a common brightness, and are crucial for generating a high quality HDR image. Generally, the combination weights are greater for input pixel intensities of better quality, where the determination of pixel quality may be based on a number of properties and associated criteria. The systems and methods disclosed herein are not specific to certain quality metrics; any metric or combination of metrics may be used. For example, greater combination weight may be given to input pixel intensities that are above the sensor noise level, below saturation, in a linear regime of the sensor response, of high signal-to-noise ratio, and/or considered being of better quality based on any suitable single metric or combination of metrics. Hence the presently disclosed HDR image generations systems and methods are adaptable to a very wide range of use scenarios and, importantly, allow for simultaneous consideration of a multitude of different quality metrics. The combination weights are determined from a comparison of all input pixel intensities corresponding to a given pixel in the HDR output image, as opposed to independent evaluation of input pixel intensities. This results in more optimal combination weights as the comparison provides additional information that can be evaluated and utilized to determine the combination weights. Further, the present systems and methods assign combination weights in a smooth fashion. Specifically, the combination weights associated with a given pixel in the HDR output image are a continuous function of all corresponding input pixel intensities. As a result, the HDR output image typically provides a smooth and real representation of the actual scene and is void of brightness or color discontinuities in regions of the image representing smooth brightness and/or color transitions in the actual scene, a common HDR image combination artifact in conventional solutions. All the above mentioned advantages of the presently disclosed systems and methods are provided at low computational cost using a simple weighting map, sparsely populated with predefined combination weights.

Figure 1:
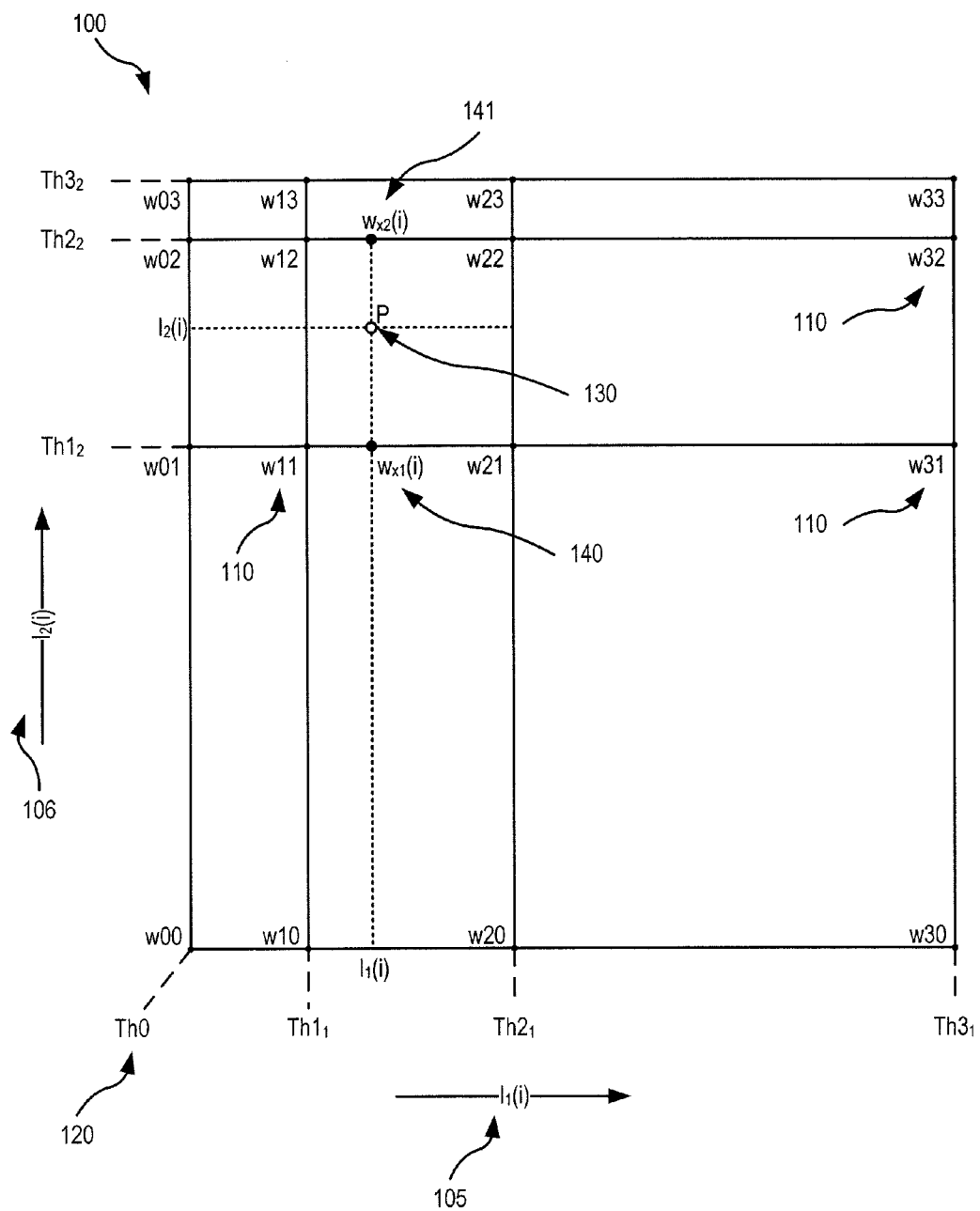
FIG. 1 illustrates a weighting map for determination of combination weights used in high dynamic range image combination, according to an embodiment.

The presently disclosed systems and methods for generating HDR images utilize a weighting map for determining the combination weights. FIG. 1 shows a weighting map 100 used to determine the combination weights of a pair of corresponding pixels from two individual input images that are to be combined into a single HDR output image. As will be discussed below, when combining more than two input images, weighting map 100 may be applied to a series of pairs of input images. Weighting map 100 shows the combination weight for an individual pixel i in an input image 1 as a function of intensities $I_1(i)$ and $I_2(i)$, where $I_1(i)$ is the pixel's intensity in input image 1 and $I_2(i)$ is the pixel's intensity in a corresponding input image 2. X-axis 105 represents intensity $I_1(i)$, and y-axis 106 represents intensity $I_2(i)$.

Weighting map 100 contains a discrete, two-dimensional grid of predefined combination weights $wn_1 n_2$ (see labels 110 in FIG. 1, not all predefined combination weights $wn_1 n_2$ are labeled) in an embodiment where $n_1$ and $n_2$ are integers in the range 0-3. In this embodiment, weighting map 100 is a 4×4 grid, although weighting map 100 may have other dimensions without departing from the scope hereof. The grid positions defining combination weights $wn_1 n_2$ correspond to threshold Th0 (label 120 in FIG. 1), common to input images 1 and 2, thresholds $Th1_1$, $Th2_1$, and $Th3_1$ (not labeled in FIG. 1) assigned to image 1, and thresholds $Th1_2$, $Th2_2$, and $Th3_2$ (not labeled in FIG. 1) assigned to image 2. These thresholds indicate a desired division of the full intensity range of pixel i in input images 1 and 2. For instance, a threshold may coincide with a lower limit for above-noise pixel intensities, an upper limit for pixel intensities free of saturation effects, zero pixel intensity, highest possible pixel intensity; or a pair of thresholds may bracket a linear range of the sensor response or a range of signal-to-noise ratios. In one exemplary embodiment, threshold Th0 is zero pixel intensity, threshold $Th1_1$ is the lower limit for above-noise pixel intensities, threshold $Th1_1$ and $Th2_1$ together bracket a linear range of the sensor response, threshold $Th3_1$ is the highest possible pixel intensity, $Th1_2$ and $Th2_2$ together bracket a linear range of the sensor response, $Th2_2$ is the upper limit for pixel intensities free of saturation effects, and $Th3_2$ is the highest possible pixel intensity.

In alternative embodiments, the weighting map is based on more or fewer thresholds than weighting map 100, resulting in a more or less dense grid.

The thresholds may or may not be the same for input images 1 and 2. If images 1 and 2 are known to have different properties, it may be advantageous to define different thresholds for images 1 and 2. Such knowledge may be based either on an evaluation of the actual images or based on general knowledge of the conditions under which images 1 and 2 are captured, e.g., exposure time. For instance, longer exposure times are generally associated with a higher noise level due to accumulation of, e.g., thermally induced signal during the exposure. This may be taken into consideration in weighting map 100 by defining thresholds representative of the noise floor that are a function of the exposure time. If images 1 and 2 are captured at different exposure times, this threshold would be different for images 1 and 2. In general expressions, the weighting map may be based on n thresholds in one dimension and m thresholds in the other dimension, where n,m≥2, resulting in a n×m grid. More information may be embedded in the weighting map by implementing more thresholds. However, this is to be traded off against the memory and computational cost associated with the storage and manipulation of a larger matrix.

Any given pair of actual pixel intensities, $I_1(i)$ from input image 1 and $I_2(i)$ from input image 2, define a point P (indicated by label 130 in FIG. 1) in weighting map 100. If point P coincides with a predefined combination weight $wn_1n_2$, the combination weight $w_1(i)=wn_1n_2$ is assigned to the pixel i of input image 1 and the combination weight $w_2(i)=1-w_1(i)$ is assigned to pixel i of input image 2. Likely, point P will not coincide with a predefined combination weight, in which case the combination weight $w_1(i)$ for pixel i in input image 1 is found by interpolation using the four nearest predefined combination weights $wn_1n_2$. With the exemplary location of point P in FIG. 1, the interpolation is based on predefined combination weights w11, w12, w21, and w22.

Interpolation may be performed using any method known in the art, for instance bilinear interpolation. In an embodiment utilizing bilinear interpolation, linear interpolation in the x-direction may be applied to determine intermediate combination weights used in subsequent linear interpolation in the y-direction to find the final combination weight. Linear interpolation is performed along the gridline defined by w11 and w21 to determine an intermediate combination weight $w_{x1}(i)$, indicated by label 140 in FIG. 1, and along the gridline defined by w12 and w22 to determine an intermediate combination weight $w_{x2}(i)$, indicated by label 141 in FIG. 1, according to the equations $$w_{x1}(i) = \frac{Th2_1 - I_1(i)}{Th2_1 - Th1_1} w_{11} + \frac{I_1(i) - Th1_1}{Th2_1 - Th1_1} w_{21}, \quad \text{(Eq. 1a)}$$

and $$w_{x2}(i) = \frac{Th2_1 - I_1(i)}{Th2_1 - Th1_1} w_{12} + \frac{I_1(i) - Th1_1}{Th2_1 - Th1_1} w_{22}. \quad \text{(Eq. 1b)}$$

The combination weight $w_1(i)$ for pixel i of input image 1, associated with point P (label 100 in FIG. 1), is found by linear interpolation in the y direction along the line defined by $w_{x1}(i)$ and $w_{x2}(i)$ according to the equation $$w_A(i) = \frac{Th2_2 - I_2(i)}{Th2_2 - Th1_2} w_{x1}(i) + \frac{I_2(i) - Th1_2}{Th2_2 - Th1_2} w_{x2}(i), \quad \text{(Eq. 2)}$$

and the corresponding combination weight $w_2(i)$ for pixel i of input image 2 is $w_2(i)=1-w_1(i)$.

Weighting map 100 and the use of interpolation ensures that the combination weights are a continuous function of the input pixel intensities. There are no discontinuities in the weight values anywhere in weighting map 100, as would be the case if, for instance, constant weights were assigned to certain ranges of pixel intensities. Therefore, a smooth intensity and/or color transition in the actual scene is reproduced as a smooth intensity and/or color transition in the HDR output image.

Weighting map 100 further allows for the use of metrics based on a comparison of pixel intensities $I_1(i)$ and $I_2(i)$. This aspect of weighting map 100 may be used to diagnose artifacts and reduce their contribution to the HDR output image generated using weighting map 100. Examples of such use is provided here for a situation where image 1 is recorded at higher brightness than image 2. For example, image 1 may be recorded at a longer exposure time than image 2. Consider a pair of recorded pixel intensities defining a point in weighting map close to the noise floor for both image 1 and 2. In an algorithm based on only independent evaluation of the input images, the pixels belonging to images 1 and 2 would likely be assigned near-equal low weights. In cases with only two recorded input images, or where this particular pixel is close to the noise floor in all input images, this would result in poor quality of the corresponding pixel in the output images. However, the knowledge that image 1 is recorded at higher brightness than image 2 may be incorporated into weighting map 100 at no additional cost. Predefined combination weights $wn_1n_2$ (see label 110 in FIG. 100) may be defined to reflect the physical expectation that, for dim signals near the noise-floor, image 1 provides the best representation of the actual scene. A similar example of advantageous use of weighting map 100 over performing only independent evaluation of input pixel intensities exists at the other end of the intensity range, near the sensor saturation level. Here, predefined combination weights $wn_1n_2$ (label 110 in FIG. 1) may be defined to result in a higher combination weight being assigned to the pixel belonging to image 2.

In cases with more than two input images, weighting map 100 may be applied in a pairwise fashion to the input pixel intensities, $I_1(i), \ldots I_N(i)$, where N>2 and $I_n(i)$ belongs to input image n. In an example, weighting map 100 is first applied to pixel intensities $I_1(i)$ and $I_2(i)$ leading to the determination of corresponding combination weights $w_1(i)$ and $w_2(i)$. This may be expressed as a relative combination weight $w_{rel,1}(i)=w_1(i)/w_2(i)$ assigned to pixel intensity $I_1(i)$. Next, weighting map 100 is applied to pixel intensities $I_2(i)$ and $I_3(i)$ leading to the determination of a relative combination weight $w_{rel,2}(i)$ for pixel intensity $I_2(i)$. Weighting map 100 is applied in this fashion until relative combination weights $w_{rel,n}(i)$ where n=1, ... N-1, are determined. The normalization condition $\Sigma_{n=1}^{N} w_n(i)=1$ is applied to yield an absolute, as opposed to relative, value for the combination weight $w_N(i)$ for pixel intensity $I_N(i)$:

$$w_N(i) = \left\{1 + \sum_{n=1}^{N-1}\left[\prod_{m=n}^{N-1} w_{rel,m}(i)\right]\right\}^{-1}. \quad \text{(Eq. 3)}$$

All other absolute combination weights, $w_n(i)$, where n=1, ..., N-1, may be deduced therefrom using the relation $w_{rel,n}(i)=w_n(i)/w_{n+1}(i)$. Eq. 3 holds true also for cases with only two input images. Note that the thresholds and predefined combination weights in weighting map 100 may be different for each input image n.

Figure 2:
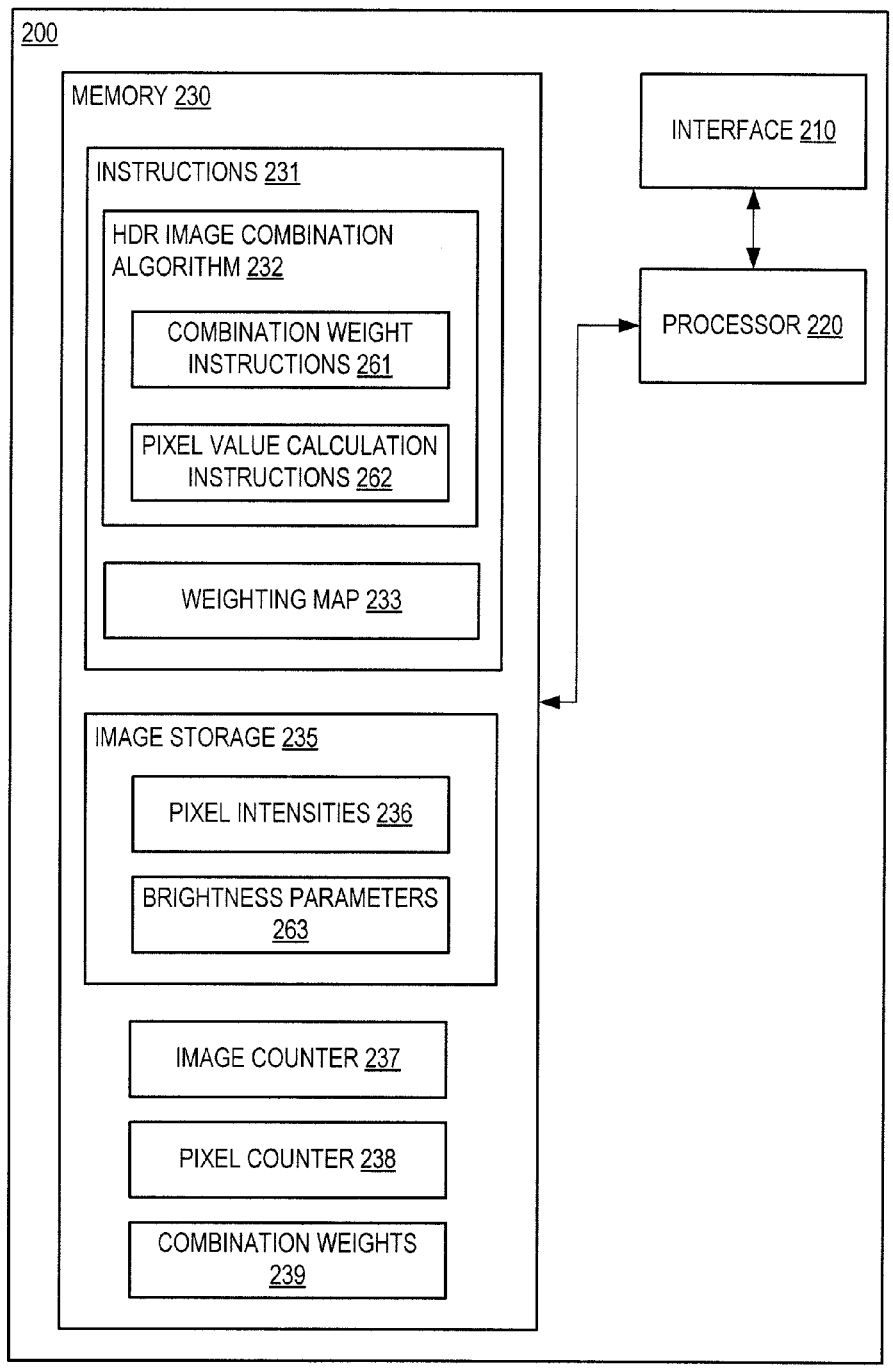
FIG. 2 illustrates a system for generating high dynamic range images using a weighting map, according to an embodiment.

FIG. 2 illustrates an embodiment of a high dynamic range image generation system capable of performing HDR image combination using the presently disclosed HDR image combination methods. System 200 of FIG. 2 includes an interface 210 for receiving input images and outputting HDR images generated based on the received input images. Interface 210 is in communication with a processor 220 that further communicates with a memory 230. Memory 230 includes machine readable instructions 231, that when executed by processor 220, generate HDR images. Instructions 231 include a weighting map 233 and at least one HDR image combination module 232, which, for example, executes method 500 of FIG. 5. In certain embodiments, HDR image combination module 232 includes combination weight module 261 and pixel value calculation module 262. Combination weight module 261 includes machine readable instructions, that when executed by processor 220, determine combination weights, such as by executing method 400 of FIG. 4. Pixel value calculation module 262 includes machine readable instructions, that when executed by processor 220, calculate a high dynamic range image pixel value, such as by executing step 550 of method 500 of FIG. 5. Weighting map 233 is, for example, map 100 of FIG. 1 with actual numbers assigned to the predetermined combination weights 110 of FIG. 1, for determining combination weights according to HDR image combination module 232.

Memory 230 further includes an image storage 235 for storage of both input images and, optionally, generated HDR output images. Image storage 235 may include pixel intensities 236 obtained from the input images, and brightness parameters 263 representative of the brightness conditions under which the input images were recorded. Examples of brightness parameters include exposure time, aperture stop, sensor gain, and combinations thereof. Processor 220 and memory 230 may be integrated in a microprocessor. In certain embodiments, memory 230 further contains an image counter 237, a pixel counter 238, and combination weights 239 to facilitate performance of, e.g., method 500 of FIG. 5. Without departing from the scope of the present disclosure, some of the elements included in memory 230 as illustrated in FIG. 2 may instead be implemented in separate electronic circuitry external to memory 230.

Figure 3:
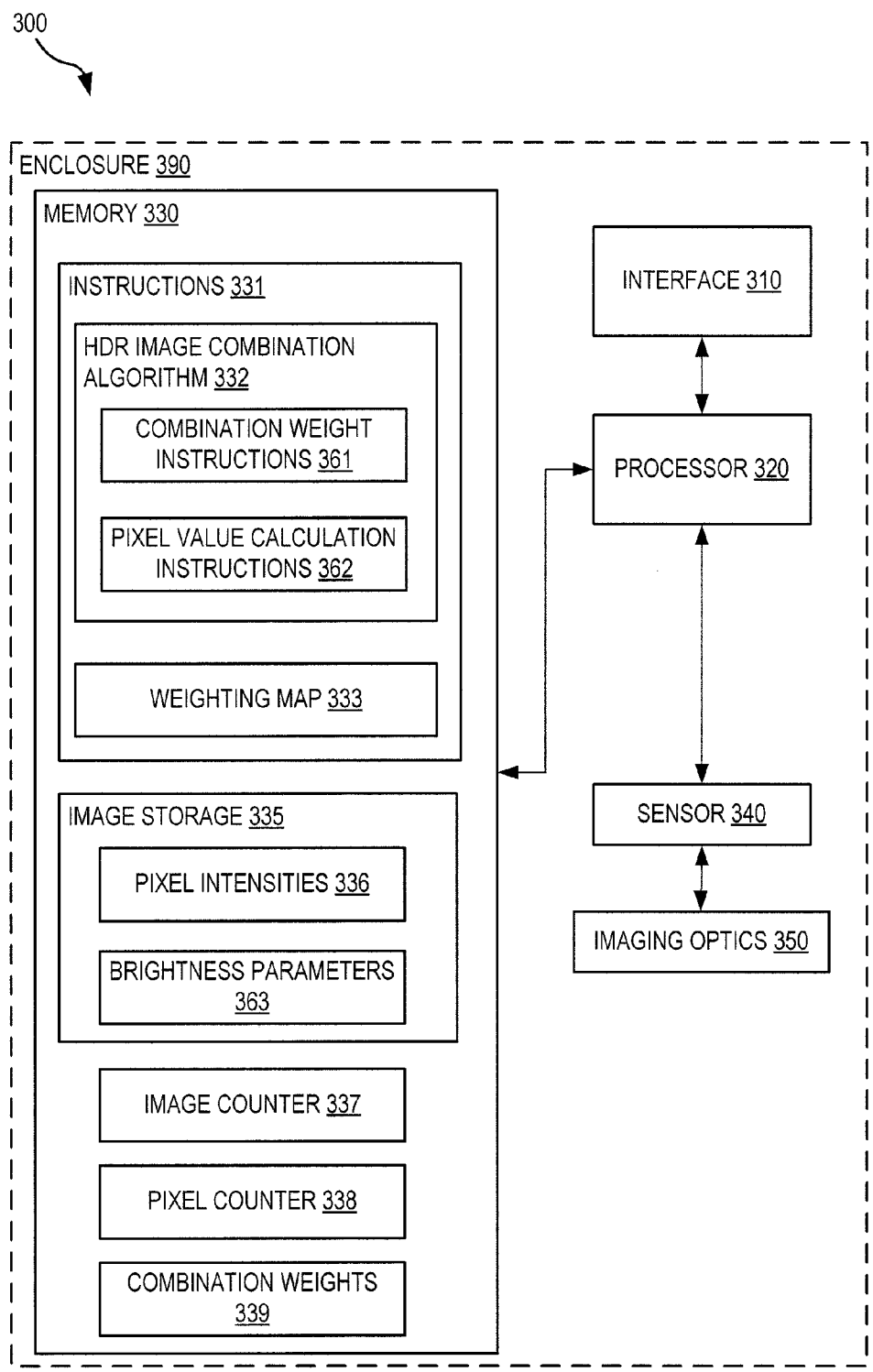
FIG. 3 illustrates a system for capture of images and generation of high dynamic range images using a weighting map, according to an embodiment.

In some embodiments, system 200 of FIG. 2 is integrated with or within the camera used to record the input images. One such embodiment is illustrated in FIG. 3 as a system 300. System 300 includes an interface 310 for, e.g., communicating with a user and/or a remote system such as a computer, and a processor 320. Processor 320 is further in communication with a memory 330 and a sensor 340 that records the input images created by imaging optics 350. Memory 330 includes machine readable instructions 331, that when executed by processor 320, generate HDR images based on input images recorded by sensor 340. Instructions 331 include a weighting map 333 and at least one HDR image combination module 332, which, for example, executes method 500 of FIG. 5. In certain embodiments, HDR image combination module 332 includes combination weight module 361 and pixel value calculation module 362. Combination weight module 361 includes machine readable instructions, that when executed by processor 320, determine combination weights, such as by executing method 400 of FIG. 4. Pixel value calculation module 362 includes machine readable instructions, that when executed by processor 320, calculate a high dynamic range image pixel value, such as by executing step 550 of method 500 of FIG. 5. Weighting map 333 is, for example, map 100 of FIG. 1 with actual numbers assigned to the predetermined combination weights 110 of FIG. 1, for determining combination weights according to HDR image combination module 232.

Memory 330 further includes an image storage 335 for storing input images and, optionally, HDR output images. As discussed for system 200, in certain embodiments of system 300, image storage 335 contains pixel intensities 336 and brightness parameters 363. Processor 320 and memory 330 may be integrated in a microprocessor. In certain embodiments, memory 330 further contains an image counter 337, a pixel counter 338, and combination weights 339 to facilitate performance of, e.g., method 500 of FIG. 5. Some of the elements included in memory 330 as illustrated in FIG. 3 may instead be implemented in separate electronics circuitry external to memory 330, without departing from the scope of the inventions disclosed herein.

System 300 may further include an optional enclosure 390. Optional enclosure 390 has an opening (not shown in FIG. 3) such that imaging optics 350 may be exposed to light, i.e., the scene to be captured. In embodiments of system 300 not including optional enclosure 390, sensor 340 and imaging optics 350 may be arbitrarily far away from the remaining portions of system 300. Sensor 340 may be in communication with processor 320 via a wired or wireless communication path.

Figure 4:
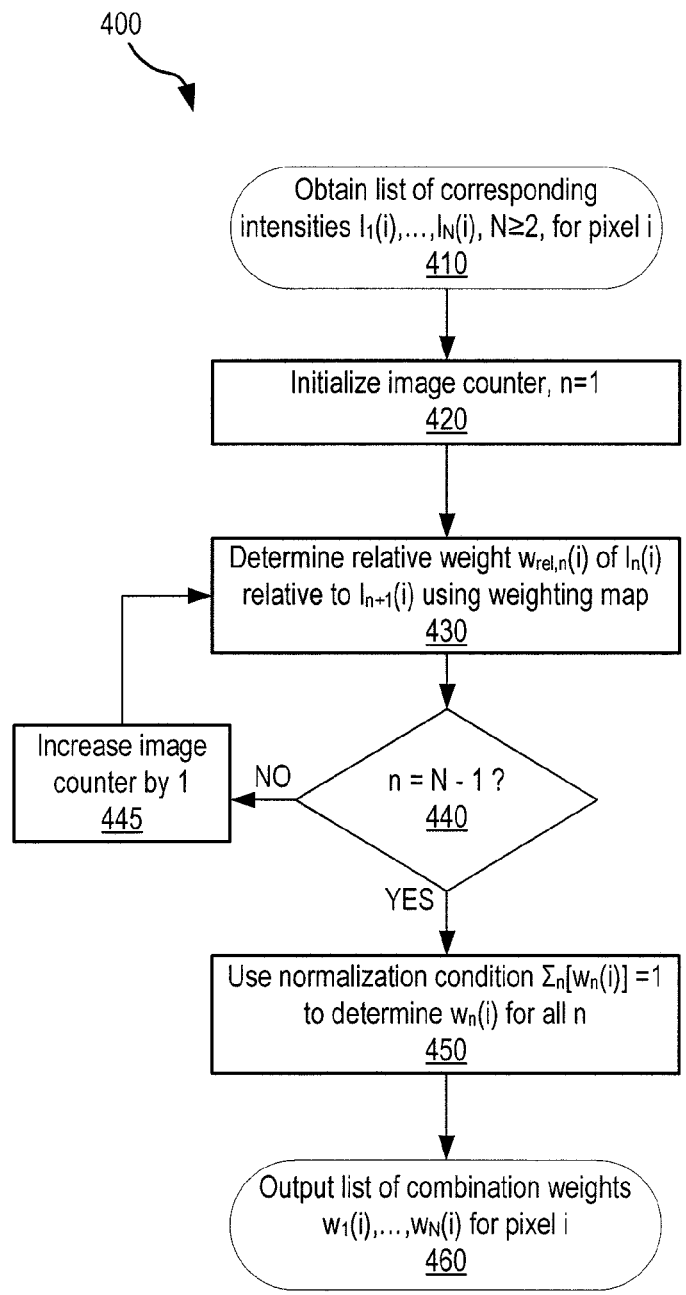
FIG. 4 illustrates a method for determining combination weights, using a weighting map, according to an embodiment.

FIG. 4 shows a method 400 for determining the combination weights of a given pixel i in an HDR output image from a series of input images. Method 400 utilizes a weighting map, e.g., weighting map 100 of FIG. 1. Method 400 may, for example, be implemented in system 200 of FIG. 2 or system 300 of FIG. 3. The instructions executing method 400 may be located in memory 230 of system 200, shown in FIG. 2, as HDR image combination module 232 and weighting map 233. Likewise, instructions executing method 400 may be located in memory 330 of system 300 (FIG. 3), as HDR image combination module 332 and weighting map 333. In one embodiment, the instructions of method 400 are implemented in system 200 of FIG. 2 as combination weight module 261. In another embodiment, the instructions of method 400 are implemented in system 300 of FIG. 3 as combination weight module 361.

In a step 410, a list of corresponding pixel intensities $I_1(i), \ldots I_N(i)$, where $N \geq 2$, are obtained. In one example of step 410, interface 210 of system 200 (FIG. 2) receives pixel intensities $I_1(i), \ldots I_N(i)$ from an external system, and processor 220 stores the pixel intensities in image storage 235 as pixel intensities 236. In another example of step 410, sensor 340 (FIG. 3) generates pixel intensities $I_1(i), \ldots I_N(i)$, and processor 320 stores the pixel intensities in image storage 335 as pixel intensities 336.

An image counter n, e.g., image counter 337 of system 300 (FIG. 3), is initialized to n=1 in a step 420. In a step 430, the relative combination weight $w_{rel,n}(i)$ of pixel intensity $I_n(i)$, relative to pixel intensity $I_{n+1}(i)$, is determined using a weighting map (e.g., weighting map 100 of FIG. 1). A query on the value of the image counter n is made in a step 440. If n is different from N−1, method 400 proceeds to a step 445, in which the image counter is increased by 1, before returning to step 430. If n=N−1, method 400 instead proceeds to a step 450 where a normalization condition, e.g., $\Sigma_{n=1}^{N} w_{rel,n}(i)=1$ mentioned above, is used to determine the combination weights $w_n(i)$ for all input images. Step 450 may be performed using the algorithm outlined above, utilizing Eq. 3.

Steps 420 through 450 may be performed by, e.g., processor 220 of FIG. 2 or processor 320 of FIG. 3 using weighting map 233 (FIG. 2) or 333 (FIG. 3), respectively. In an example of step 420, processor 220 of system 200 (FIG. 2) initializes image counter 237 stored in memory 230 to a value of one. In an example of step 430, processor 220 of system 200 (FIG. 2) determines relative combination weights using weighting map 233 and associated instructions stored in instructions 231 within memory 230, and proceeds to store the relative combination weights to memory 230 as a portion of combination weights 239. Processor 220, for example, may perform step 440 by evaluating the value of image counter 237 stored in memory 230. In an example, processor 220 also performs step 445 by reading the value of image counter 237 stored in memory 230, increasing this value by one and storing it in memory 230 as image counter 237. In an example of step 450, processor 220 reads the relative combination weights, for all images, stored in combination weights 239 in memory 230, applies the normalization condition stored in instructions 231 in memory 230, determines the final combination weights for all images, and stores the final combination weights in combination weights 239 in memory 230.

In a step 460, the combination weights determined in step 450 are outputted as a list $w_1(i), \ldots w_N(i)$ corresponding to the list of pixel intensities $I_1(i), \ldots I_N(i)$ provided in step 410. These combination weights may, for example, be stored in memory 230 (FIG. 2) or 330 (FIG. 3) for further processing by processor 220 (FIG. 2) or 320 (FIG. 3) and/or be outputted by interface 210 (FIG. 2) or 310 (FIG. 3). In an example of step 460, processor 220 of system 200 (FIG. 2) reads the combination weights stored as part of combination weight 239 and sends the combination weights to interface 210.

Figure 5:
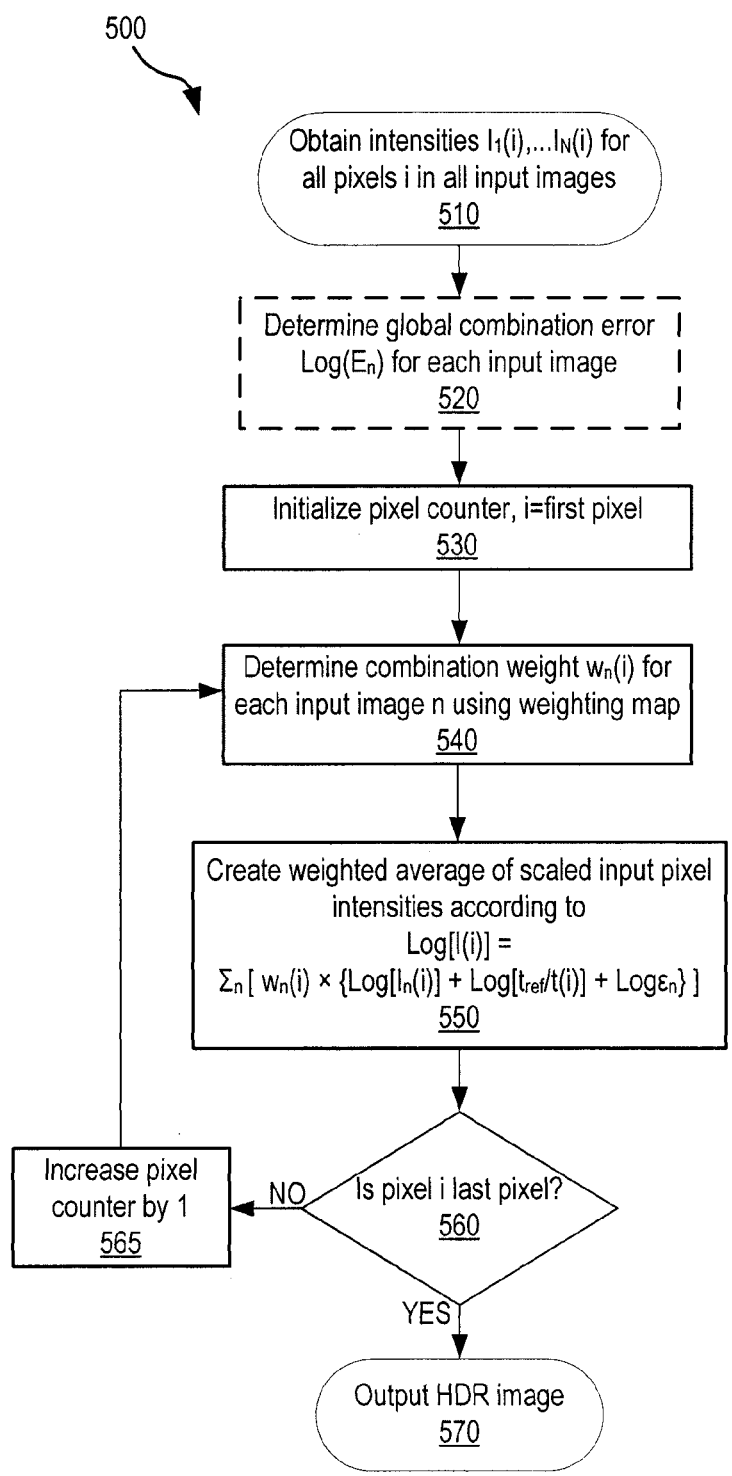
FIG. 5 illustrates a method for generating high dynamic range images using a weighting map, according to an embodiment.

FIG. 5 illustrates a method 500 for generating HDR images from multiple input images utilizing a weighting map. For example, method 500 may use weighting map 100 of FIG. 1. Method 500 may be implemented in system 200 of FIG. 2 or system 300 of FIG. 3. In this case, the instructions of method 500 may be located in memory 230 of system 200, shown in FIG. 2, as HDR image combination module 232 and weighting map 233. In the case of implementation into system 300 (FIG. 3), the instructions of method 500 may be located in memory 330 of system 300, as HDR image combination module 332 and weighting map 333. The concepts utilized in method 500 of FIG. 5 are outlined in the following before turning to a detailed description of method 500.

Briefly, method 500 of FIG. 5 determines combination weights corresponding to all pixels in the HDR output image, scales the input pixel intensities to a common brightness, and, optionally, determines and applies a global, i.e., image-wide, combination error. The recorded intensity for a sensor pixel i, $I_n(i)$, in an image n, is a function of the sensor irradiance E(i) and a value representative of image brightness controlled by a sensor or camera property (or properties), e.g., exposure time, sensor gain, and aperture stop. For illustration, the present discussion assumes that different brightnesses of recorded images are achieved by recording the individual images at different exposure times $t_n$; it is to be understood that the HDR image combination methods disclosed herein may be applied to images recorded using any suitable method for varying image brightness, including, but not limited to, adjusting sensor gain and/or aperture stop. The recorded pixel intensity for pixel i in image n can be expressed as $I_n(i) = f[E(i) \times t_n]$, where f is the sensor response function and $t_n$ is the exposure time. It is assumed that the scene is static. Hence, the sensor irradiance E(i) is the same for all images. In a linear regime of the sensor response function, typically the range between the noise floor and saturation, the intensities $I_1(i)$ and $I_2(i)$ of pixel i in two images 1 and 2 obey the equations $$\frac{I_1(i)}{I_2(i)} = \frac{t_1}{t_2}, \quad \text{(Eq. 4a)}$$

and $$\text{Log}[I_1(i)] = \text{Log}[I_2(i)] + \text{Log}\left[\frac{t_1}{t_2}\right], \quad \text{(Eq. 4b)}$$

where $t_1$ and $t_2$ are the exposure times for images 1 and 2.

If one or both of the pixel intensities $I_1(i)$ and $I_2(i)$ fall into a non-linear regime of the sensor response function and/or the exposure times are not accurate, Eqs. 4a and 4b are not satisfied. In an embodiment, a combination error term Log $\epsilon$ is incorporated as shown in the equation $$\text{Log}[I_1(i)] = \text{Log}[I_2(i)] + \text{Log}\left[\frac{t_1}{t_2}\right] + \text{Log}\epsilon, \quad \text{(Eq. 5)}$$

where the combination error term Log $\epsilon$ is estimated from the combination error averaged over all pixels that are below saturation. This estimation method is expressed in the equation $$\text{Log}\epsilon = \frac{\sum_{j}^{M}\left\{\text{Log}[I_1(j)] - \left(\text{Log}[I_2(j)] + \text{Log}\left[\frac{t_1}{t_2}\right]\right)\right\}}{M}, \quad \text{(Eq. 6)}$$

where M is the number of pixels that are below saturation. In this embodiment, the error term Log $\epsilon$ is global, i.e., the same for all pixels in image 1. It is to be understood that other correction methods, including methods providing local or even pixel specific correction may be used in combination with other aspects of the HDR image combination methods disclosed herein, e.g., weighting map 100 of FIG. 1. Further, the presently disclosed HDR image combination methods may be used with no correction methods applied.

Using combination weights, for example determined using a weighting map (e.g., weighting map 100 of FIG. 1) according to method 400 of FIG. 4, the intensity of pixel i in the HDR output image, I(i), may be written as $$\text{Log}[I(i)] = \quad \text{(Eq. 7)}$$
$$w_1(i) \times \text{Log}[I_1(i)] + w_2(i) \times \left\{\text{Log}[I_2(i)] + \text{Log}\left[\frac{t_1}{t_2}\right] + \text{Log}\epsilon\right\},$$

where $w_1(i)$ and $w_2(i)$ are the combination weights for pixel i in images 1 and 2. According to this equation, the input pixel intensities are scaled to the brightness or, equivalently, exposure time of image 1 and the combination correction term Log $\epsilon$ is calculated in reference to image 1. In an alternate embodiment, the pixel intensities may be scaled to a different exposure time including, but not limited to, that of image 2. For computational ease and cost, it is advantageous to let image 1 be the image recorded at the longest exposure time, i.e., $t_1 > t_2$, such that the pixel intensities of image 2 are scaled to greater numbers rather than smaller numbers. In this case, the scaling computations rely on multiplication rather than division. The expression in Eq. 7 may be readily extended to more than two input images. For N input images scaled to a reference exposure time $t_{ref}$, the expression becomes $$\text{Log}[I(i)] = \sum_{n}^{N} \left[ w_n(i) \times \left\{ \text{Log}[I_n(i)] + \text{Log}\left[\frac{t_{ref}}{t_n}\right] + \text{Log}\varepsilon_n \right\} \right], \quad \text{(Eq. 8)}$$

where $w_n(i)$ and $I_n(i)$ are the combination weight and pixel intensity, respectively, of pixel in image n, and $t_n$ and $\text{Log } \varepsilon_n$ are the exposure time and combination error term for image n. Again, computational advantages are associated with setting the exposure time $t_{ref}$ to the longest used exposure time. Note that if combination errors are calculated in reference to image M, the combination error, $\text{Log } \varepsilon_M$, for image M is zero.

FIG. 5 illustrates an HDR image combination method 500 utilizing the expression for the HDR output pixel intensities, I(i), provided in Eq. 8 as well as the methods upon which it is based. In one embodiment, method 500 is implemented in system 200 of FIG. 2 as HDR image combination module 232. Method 500 may also be implemented in system 300 of FIG. 3 as HDR image combination module 332.

In a step 510, corresponding pixel intensities $I_1(i), \ldots I_N(i)$ are obtained for all input images. The pixel intensities may be obtained directly, or indirectly by first obtaining the input images and then extracting the pixel intensities therefrom. For example, if method 500 is implemented into system 300 of FIG. 3, the input images or pixel intensities may be provided by sensor 340 or interface 310 and stored in image storage 335. As another example, wherein method 500 is implemented into system 200 of FIG. 2, the input images or pixel intensities may be provided by interface 210 and stored in image storage 235. In one example of step 510, processor 220 obtains the pixel intensities from all input images using interface 210 and stores these in memory 230 as pixel intensities 236. In another example of step 510, processor 220 first obtains all images using interface 210, stores the images to image storage 235, determines the pixel intensities for all the images, and stores the pixel intensities in memory 230 as pixel intensities 236. This latter example may be relevant, for instance, if the images are obtained in a compressed format, in which case processor 220 may need to decompress the compressed images stored in image storage 235 in order to determine the pixel intensities.

In an optional step 520, global combination errors $\text{Log } \varepsilon_n$ are determined for each input image using, for example, the method disclosed above. In one example of optional step 520, processor reads pixel intensities 236 stored in memory 230, determines the global combination error for all images, and stores the global combination errors to memory 230.

A pixel counter i is initialized in a step 530, i=first pixel. In one example of step 530, processor 220 (FIG. 2) initialized the value of pixel counter to one and stores this value to pixel counter 238 in memory 230.

In a step 540, the combination weights $w_n(i)$ for pixel i are determined for each input image n using a weighting map, e.g., weighting map 100 of FIG. 1 and following, for example, method 400 of FIG. 4. In one example of step 540, processor 220 first reads pixel counter 238. Optionally, the instructions for performing step 540 are stored in memory 230 as combination weight instructions 262. Next, processor 200 reads pixel intensities 236 for the pixel number that equals the value of pixel counter 238. Processor 220 then uses weighting map 233 and associated instructions stored in instructions 231 within memory 230 to determine the combination weights for this pixel for each image. This may, for example, involve reads and increments of image counter 237 stored in memory 230. The combination weights are then stored by processor 220 to combination weights 239 in memory 230.

The intensity of pixel i in the HDR output image is calculated in a step 550 using the combination weights determined in step 540 and utilizing Eq. 8. Optionally, the instructions for performing step 550 are stored in memory 230 as pixel value calculation instructions 262. If optional step 520 is omitted, the combination error correction term $\text{Log } \varepsilon_n$ is omitted in step 550. In one example of step 550, processor 220 uses repeated reads and increments of pixel counter 238 to read, for a given value of pixel counter 238, (a) the combination weights stored in combination weights 239 in memory 230, (b) pixel intensities stored in pixel intensities 236 in memory 230, (c) exposure times stored in memory 230 either as part of image storage 235 if the exposure times were obtained together with the images, or as part of instructions 231 if the exposure times are preset, and (d) the optional global combination error stored in memory 230. Processor 220 then calculates the combined pixel intensity and stores it to pixel intensities 236 in memory 230.

A step 560 makes a query to determine if all pixels of the HDR output image have been processed. In one example of step 560, processor 220 reads and evaluates pixel counter 238 stored in memory 230. If not all pixels have been processed, method 500 proceeds to a step 565, wherein the pixel counter is increased by one, and then returns to step 540. In one example of step 565, processor 220 reads pixel counter 238 stored in memory 230, increments its value by one, and stores the incremented value to memory 230 as pixel counter 238.

If the answer to the query in step 560 is yes, a step 570 outputs an HDR image composed by the pixel intensities calculated in step 550. In one example of step 560, processor 220 reads the combined pixel intensities stored in pixel intensities 236 in memory 230 and sends these to interface 210 after optional processing into a desired image format by processor 220.

All systems and methods for HDR image generation disclosed herein apply to both monochrome and color images. A standard color sensor is composed of identical groups of pixels, each group containing pixels sensitive to specific color ranges. For instance, for a so-called RGB sensor, each group may be composed of a pixel (R) sensitive to the red portion of the visible spectrum, two pixels (G) sensitive to the green portion of the visible spectrum, and a pixel (B) sensitive to the blue portion of the visible spectrum. In an embodiment, the HDR image combination methods disclosed herein may be applied to each pixel separately, regardless of its color sensitivity. In another embodiment, the combination weights are determined, using a weighting map (e.g., weighting map 100 of FIG. 1) based only on pixels of one form of color sensitivity, e.g, pixels sensitive to the red portion of the visible spectrum. These combination weights may subsequently be extended to pixels of other color sensitivities within the same pixel group, assuming a sensor configuration similar to that discussed for the RGB sensor. In yet another embodiment, the combination weights may be determined using a weighting map (e.g., weighting map 100 of FIG. 1), where the input pixel intensities (e.g., pixel intensities 105 and 106 in FIG. 1) are the sum, average, or weighted average of the intensities of pixels of different color sensitivities within a pixel group.

Combination of Features

Features described above as well as those claimed below may be combined in various ways without departing from the scope hereof. For example, it will be appreciated that aspects of one method/system described herein may incorporate or swap features of another camera method/system described herein. The following examples illustrate possible, non-limiting combinations of embodiments described above. It should be clear that many other changes and modifications may be made to the methods and system herein without departing from the spirit and scope of this invention:

(A) A method for determining a pixel value in a high dynamic range image based on first and second input images of different brightness, including a step of obtaining a first input pixel intensity of a first pixel in the first input image and a second input pixel intensity of a corresponding pixel in the second input image, and a step of determining a first combination weight for the first input pixel intensity and a second combination weight for the second input pixel intensity, each of the first and second combination weights being a function of the first and second input pixel intensities.

(B) The method of (A) may further include a step of calculating the pixel value in the high dynamic range image as a weighted average of the first and second input pixel intensities using the first and second combination weights, wherein the step of calculating comprises scaling the first and second input pixel intensities to a common image brightness.

(C) In the methods denoted as (A) and (B), the function may be a continuous function of the first and second input pixel intensities.

(D) In the methods denoted as (A) through (C), the function may have predefined values for a plurality of pairs of a predefined first pixel intensity and a predefined second pixel intensity.

(E) In the method denoted as (D), the predefined values may be defined by consideration of at least one quality metric.

(F) In the method denoted as (E), the at least one quality metric may include one or more of intensity, noise contribution, saturation effects, signal-to-noise ratio, linearity of sensor response, ratio of first and second pixel intensities, or a combination thereof.

(G) In the methods denoted as (E) and (F), the quality metric may include at least one quality metric that utilizes a comparison of the first and second input pixel intensities.

(H) In the methods denoted as (D) through (G), a value of the function may be determined by interpolating between pairs of predefined first and second pixel intensities, when the first and second input pixel intensities do not coincide with the pairs of predefined first and second pixel intensities.

(I) In the method denoted as (H), the value of the function may be determined by interpolating between the nearest pairs of predefined first and second pixel intensities.

(J) In the methods denoted as (H) and (J), the step of interpolating may include bilinear interpolation.

(K) The methods denoted as (A) through (J) may further include obtaining a first brightness parameter associated with the first input image and a second brightness parameter associated with the second input image.

(L) In the method denoted as (L), scaling may be based on first and second brightness parameters.

(M) The methods denoted as (K) and (L) may further include correcting for errors in at least one of the first and second brightness parameters.

(N) In the method denoted as (M), the errors may be caused by one or more of a non-linear sensor response and incorrect evaluation of brightness conditions under which at least one of the first and second input images is captured.

(O) A method for determining a pixel value in a high dynamic range image from N input images of different brightness, where N is an integer greater than two, including a step of forming a list of pairs of input pixel intensities, each of the input pixel intensities corresponding to the same location in the N input images, and wherein all pairs in the list of pairs, except for the first pair in the list of pairs, include one of the input pixel intensities in the preceding pair in the list of pairs and one of the input pixel intensities not represented in any of the preceding pairs.

(P) The method denoted as (O), further including a step of determining relative combination weights for the input pixels intensities, the relative combination weights being a function of both of the input pixel intensities in the pair.

(Q) The method denoted as (P), further including applying a normalization condition to the relative combination weights to determine absolute combination weights.

(R) The methods denoted as (P) through (Q) further including calculating the pixel value in the high dynamic range image as a weighted average of the input pixel intensities, wherein the step of calculating includes scaling the input pixel intensities to a common image brightness.

(S) In the method denoted as (R), scaling may include using absolute combination weights.

(T) In the methods denoted as (0) through (S), each pair in the list of pairs may include input pixel intensities from two of the N input images of brightness such that no other of the N input images has brightness therebetween.

(U) In the methods denoted as (P) through (T), the function may be a continuous function of the input pixel intensities comprised by the pair.

(V) In the methods denoted as (P) through (U), the function may have predefined values for a plurality of pairs of predefined pixel intensities.

(W) In the method denoted as (V), the predefined values may be defined by consideration of at least one quality metric.

(X) In the method denoted as (W), the at least one quality metric may include one or more of intensity, noise contribution, saturation effects, signal-to-noise ratio, linearity of sensor response, ratio of first and second pixel intensities, or a combination thereof.

(Y) In the methods denoted as (W) and (X), the quality metric may include at least one quality metric that utilizes a comparison of the input pixel intensities in the pair.

(Z) In the methods denoted as (V) through (Y), a value of the function may be determined by interpolating between pairs of predefined pixel intensities, when the input pixel intensities do not coincide with the pairs of predefined pixel intensities.

(AA) In the method denoted as (Z), the value of the function may be determined by interpolating between the nearest pairs of predefined pixel intensities.

(AB) In the methods denoted as (Z) and (AA), the step of interpolating may include bilinear interpolation.

(AC) The methods denoted as (R) through (AB) may further include obtaining N brightness parameter, each of the N brightness parameters corresponding to a respective one of the N input images.

(AD) In the method denoted as (AC), scaling may be based on one or more of the N brightness parameters.

(AE) The methods denoted as (AC) and (AD) may further include correcting for errors in at least one of the N brightness parameters.

(AF) In the method denoted as (AE), the errors may be caused by one or more of a non-linear sensor response and incorrect evaluation of brightness conditions under which at least one of the N input images is captured.

(AG) A high dynamic range image generation system, including (a) a processor, (b) a memory communicatively coupled to the processor and including an image storage for storing first and second input pixel intensities from a first and second input image, and (c) a combination weight module, including machine readable instructions stored in the memory, that when executed by the processor, perform the function of determining a first combination weight for the first input pixel intensity and a second combination weight for the second input pixel intensity, each of the first and second combination weights being a function of the first and second input pixel intensities.

(AH) The system denoted as (AG) may further include a pixel value calculation module, including machine readable instructions stored in the memory, that when executed by the processor, perform the function of scaling the first and second input pixel intensities to a common brightness and calculating a pixel value in a high dynamic range image as a weighted average of the scaled first and second input pixel intensities using the first and second combination weights.

(AI) In the systems denoted as (AG) and (AH), the combination weight module may be adapted to interpolate between pairs of predefined first and second pixel intensities, for first and second pixel intensities, stored in the image storage, that do not coincide with the pairs of predefined first and second pixel intensities.

(AJ) In the systems denoted as (AG) through (AI), the function of the first and second input pixel intensities may implemented as a continuous function of the first and second pixel intensities.

(AK) In the systems denoted as (AG) through (AJ), the image storage may include a brightness parameter module for storing a first brightness parameter associated with the first input image and a second brightness parameter associated with the second input image.

(AL) In the systems denoted as (AH) through (AJ), the image storage may include a brightness parameter module for storing a first brightness parameter associated with the first input image and a second brightness parameter associated with the second input image, and the pixel value calculation module may include instructions for scaling the first and second input pixel intensities according to the first and second brightness parameters (AM) In the system denoted as (AL), the pixel value calculation module may include instructions for correcting for errors in one or more of the first and second brightness parameters.

(AN) A high dynamic range image generation system, including (a) a processor, (b) a memory communicatively coupled to the processor and including an image storage for storing input pixel intensities from N input images, where N is an integer greater than two, and (c) a combination weight module including machine readable instructions stored in the memory, that when executed by the processor, perform the functions of (i) forming a list of pairs of input pixel intensities, each of the input intensities corresponding to the same location in the N input images, and wherein all pairs in the list of pairs, except for the first pair in the list of pairs, comprises one of the input pixel intensities in the preceding pair in the list of pairs and one of the input pixel intensities not represented in any of the preceding pairs, (ii) determining relative combination weights for the input pixel intensities, each of the relative combination weights for a pair in the list of pairs being a continuous function of both of the input pixel intensities in the pair, and (iii) applying a normalization condition to the relative combination weights to determine absolute combination weights (AO) The system denoted as (AN) may further include a pixel value calculation module, including machine readable instructions stored in the memory, that when executed by the processor, perform the function of scaling the first and second input pixel intensities to a common brightness and calculating a pixel value in a high dynamic range image as a weighted average of the scaled first and second input pixel intensities using the first and second combination weights.

(AP) In the systems denoted as (AN) and (AO), the combination weight module may be adapted to form the list of pairs such that each pair in the list of pairs comprises input pixel intensities from two of the N input images of brightness such that no other of the N input images has brightness therebetween.

(AQ) In the systems denoted as (AN) through (AP), the function of both of the input pixel intensities in the pair may implemented as a continuous function of both of the input pixel intensities in the pair.

(AR) In the systems denoted as (AN) through (AQ), the image storage may include a brightness parameter module for storing N brightness parameters, each of the N brightness parameters being associated a respective one of the N input images.

(AS) In the systems denoted as (AO) through (AQ), the image storage may include a brightness parameter module for storing N brightness parameters, each of the N brightness parameters being associated a respective one of the N input images, and the pixel value calculation module may include instructions for scaling the pixel intensities according to one or more of the N brightness parameters.

(AT) In the system denoted as (AS), the pixel value calculation module may include instructions for correcting for errors in one or more of the N brightness parameters.

(AU) The systems denoted as (AG) through (AT) may further include an interface for one or more of controlling the system, receiving input pixel intensities, and communicating results of processing by the processor.

(AV) The systems denoted as (AG) through (AU) may further include a sensor and imaging optics cooperatively configured for image capture.

What is claimed is:

1. A method for determining a pixel value in a high dynamic range image based on first and second input images of different brightness, comprising:
    obtaining a first input pixel intensity of a first pixel in the first input image and a second input pixel intensity of a corresponding pixel in the second input image, each of the first and second input images having lower dynamic range than the high dynamic range image;
    determining a first combination weight for the first input pixel intensity and a second combination weight for the second input pixel intensity, each of the first and second combination weights being a continuous function of the first and second input pixel intensities, the function having predefined values for a plurality of pairs of a predefined first pixel intensity and a predefined second pixel intensity, the predefined values being defined by consideration of at least one quality metric;
    obtaining a first brightness parameter associated with the first input image and a second brightness parameter associated with the second input image;
    correcting for sensor-induced errors in at least one of the first and second brightness parameters; and
    calculating the pixel value in the high dynamic range image as a weighted average of the first and second input pixel intensities using the first and second combination weights, wherein the step of calculating comprises scaling, based on the first and second brightness parameters, the first and second input pixel intensities to a common image brightness.

2. The method of claim 1, the at least one quality metric comprising one or more of intensity, noise contribution, saturation effects, signal-to-noise ratio, linearity of sensor response, ratio of first and second pixel intensities.

3. The method of claim 1, the quality metric comprising at least one quality metric that utilizes a comparison of the first and second input pixel intensities.

4. The method of claim 1, a value of the function being determined by interpolating between pairs of predefined first and second pixel intensities, when the first and second input pixel intensities do not coincide with the pairs of predefined first and second pixel intensities.

5. The method of claim 4, the value of the function being determined by interpolating between the nearest pairs of predefined first and second pixel intensities.

6. The method of claim 4, the step of interpolating comprising bilinear interpolation.

7. The method of claim 1, the sensor-induced errors being caused by one or more of a non-linear sensor response and incorrect evaluation of brightness conditions under which at least one of the first and second input images is captured.

8. A method for determining a pixel value in a high dynamic range image from N input images of different brightness, where N is an integer greater than two, comprising:
    forming a list of pairs of input pixel intensities, each of the input pixel intensities corresponding to the same location in the N input images, and wherein all pairs in the list of pairs, except for the first pair in the list of pairs, comprise one of the input pixel intensities in the preceding pair in the list of pairs and one of the input pixel intensities not represented in any of the preceding pairs, each of the N input images having lower dynamic range than the high dynamic range image;
    for each pair in the list of pairs, determining relative combination weights for each of the input pixels intensities, each of the relative combination weights being a continuous function of both of the input pixel intensities in the pair, the function having predefined values for a plurality of pairs of predefined input pixel intensities, the predefined values being defined by consideration of at least one quality metric;
    applying a normalization condition to the relative combination weights to determine absolute combination weights,
    obtaining N brightness parameters respectively associated with the N input images;
    correcting for sensor-induced errors in at least one of the brightness parameters; and
    calculating the pixel value in the high dynamic range image as a weighted average of the input pixel intensities using the absolute combination weights, wherein the step of calculating comprises scaling, based on the brightness parameters, the input pixel intensities to a common image brightness.

9. The method of claim 8, wherein each pair in the list of pairs comprises input pixel intensities from two of the N input images of brightness such that no other of the N input images has brightness therebetween.

10. The method of claim 8, the value of the function is being determined by interpolating between pairs of predefined pixel intensities, when the input pixel intensities do not coincide with a pair of predefined intensities.

11. A system for generating a high dynamic range image, comprising:
    a processor;
    a memory communicatively coupled to the processor and including an image storage for storing first and second input pixel intensities from a first input image and second input image of lower dynamic range than the high dynamic range image;
    a combination weight module, including machine readable instructions stored in the memory, that when executed by the processor, perform the function of determining a first combination weight for the first input pixel intensity and a second combination weight for the second input pixel intensity, each of the first and second combination weights being a continuous function of the first and second input pixel intensities, the function having predefined values for a plurality of pairs of a predefined first pixel intensity and a predefined second pixel intensity, the predefined values being defined by consideration of at least one quality metric; and
    a pixel value calculation module, including machine readable instructions stored in the memory, that when executed by the processor, perform the function of (a) obtaining a first brightness parameter associated with the first input image and a second brightness parameter associated with the second input image, (b) correcting for sensor-induced errors in at least one of the first and second brightness parameters, (c) scaling, based on the first and second brightness parameters, the first and second input pixel intensities to a common brightness, and (d) calculating a pixel value in a high dynamic range image as a weighted average of the scaled first and second input pixel intensities using the first and second combination weights.

12. The system of claim 11, the combination weight module being further adapted to interpolate between pairs of predefined first and second pixel intensities, for first and second pixel intensities, stored in the image storage, that do not coincide with the pairs of predefined first and second pixel intensities.

13. The system of claim 11, further comprising a sensor and imaging optics cooperatively configured for image capture.

14. A system for generating a high dynamic range image, comprising:
    a processor;
    a memory communicatively coupled to the processor and including an image storage for storing input pixel intensities from N input images, N being an integer greater than two, each of the N input images having lower dynamic range than the high dynamic range image;
    a combination weight module including machine readable instructions stored in the memory, that when executed by the processor, perform the functions of (a) forming a list of pairs of input pixel intensities, each of the input intensities corresponding to the same location in the N input images, and wherein all pairs in the list of pairs, except for the first pair in the list of pairs, comprises one of the input pixel intensities in the preceding pair in the list of pairs and one of the input pixel intensities not represented in any of the preceding pairs, (b) determining relative combination weights for the input pixel intensities, each of the relative combination weights for a pair in the list of pairs being a continuous function of both of the input pixel intensities in the pair, the function having predefined values for a plurality of pairs of predefined input pixel intensities, the predefined values being defined by consideration of at least one quality metric, and (c) applying a normalization condition to the relative combination weights to determine absolute combination weights; and a pixel value calculation module including machine readable instructions stored in the memory, that when executed by the processor, perform the functions of (a) obtaining N brightness parameters respectively associated with the N input images, (b) correcting for sensor-induced errors in at least one of the brightness parameters, (c) scaling, based on the brightness parameters, the input pixel intensities to a common brightness, and (d) calculating a pixel value in a high dynamic range image as a weighted average of the scaled input pixel intensities using the absolute combination weights.

15. The system of claim 14, the combination weight module being further adapted to form the list of pairs such that each pair in the list of pairs comprises input pixel intensities from two of the N input images of brightness such that no other of the N input images has brightness therebetween.

16. The system of claim 14, further comprising a sensor and imaging optics cooperatively configured for image capture.

\* \* \* \* \*